(12) United States Patent
Saxman et al.

(10) Patent No.: US 10,273,845 B2
(45) Date of Patent: Apr. 30, 2019

(54) VEHICLE INCLUDING CABIN DISTURBANCE MITIGATION SYSTEM

(71) Applicant: GM Global Technology Operations LLC, Detroit, MI (US)

(72) Inventors: Brad A. Saxman, Brighton, MI (US); Scott M. Reilly, Southfield, MI (US); Glenn Pietila, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/440,781

(22) Filed: Feb. 23, 2017

(65) Prior Publication Data
US 2018/0238208 A1 Aug. 23, 2018

(51) Int. Cl.
| | | |
|---|---|---|
| *F01N 1/16* | (2006.01) | |
| *F01N 1/18* | (2006.01) | |
| *F01N 13/08* | (2010.01) | |
| *B60R 16/023* | (2006.01) | |

(52) U.S. Cl.
CPC .......... *F01N 1/165* (2013.01); *B60R 16/0231* (2013.01); *F01N 1/163* (2013.01); *F01N 1/166* (2013.01); *F01N 1/168* (2013.01); *F01N 1/18* (2013.01); *F01N 13/08* (2013.01); *F01N 13/082* (2013.01); *B60Y 2306/09* (2013.01); *F01N 2240/36* (2013.01); *F01N 2470/14* (2013.01); *F01N 2470/16* (2013.01); *F01N 2900/10* (2013.01); *F02D 2200/025* (2013.01)

(58) Field of Classification Search
CPC . F01N 1/163; F01N 1/165; F01N 1/18; B60Y 2306/09; F02D 2200/025
See application file for complete search history.

(56) References Cited

U.S. PATENT DOCUMENTS

| | | | | |
|---|---|---|---|---|
| 6,633,646 | B1* | 10/2003 | Hwang ................ | G10K 11/175 181/206 |
| 7,155,333 | B1* | 12/2006 | Abram .................... | F01N 1/165 701/111 |
| 2007/0227807 | A1* | 10/2007 | Meneely ................... | F01N 1/02 181/237 |
| 2009/0319160 | A1* | 12/2009 | Callahan ................... | F02D 9/04 701/111 |
| 2015/0053500 | A1* | 2/2015 | Park ........................ | F01N 1/163 181/241 |

FOREIGN PATENT DOCUMENTS

WO    WO 2016026890 A1 *  2/2016  ............ F01N 1/065

* cited by examiner

*Primary Examiner* — Audrey K Bradley
(74) *Attorney, Agent, or Firm* — Cantor Colburn LLP (57) ABSTRACT

An automotive vehicle includes an internal combustion engine that generates exhaust gas and an exhaust system that expels the exhaust gas from the vehicle via at least one of a first exhaust conduit and a second exhaust conduit. A disturbance sensor is installed within a cabin of the vehicle, and is configured to detect a disturbance within the cabin and to output a disturbance signal indicative of the disturbance. An exhaust valve has a plurality of positions and adjusts an amount of the exhaust gas delivered to the first and second exhaust conduits. The automotive vehicle further includes an electronic hardware controller in signal communication with the at least one disturbance sensor and the exhaust valve. The controller adjusts the position of the exhaust valve based on the disturbance signal to reduce the disturbance within the cabin.

15 Claims, 9 Drawing Sheets

VEHICLE INCLUDING CABIN DISTURBANCE MITIGATION SYSTEM

BACKGROUND

The subject of the disclosure relates generally to exhaust systems of an automobile vehicle, and more particularly, to reducing exhaust system induced disturbances in the vehicle cabin.

Vehicle systems include an exhaust system with a muffler device that serves to attenuate or suppress exhaust gas disturbances such as noise, for example, when expelling exhaust gas from the vehicle. Some disturbances such as exhaust noise, for example, reverberate within the vehicle cabin which is then realized by the driver and/or passengers. Past solutions for reducing undesirable cabin disturbances include masking techniques that attempt to introduce masking noises into cabin via one or more speakers. These techniques, however, do not reduce the disturbances output from the exhaust system.

In addition, the level of exhaust noise in a vehicle can vary from vehicle to vehicle due to assembly variations and variations in component fabrication. For instance, one vehicle can have a different level of exhaust induced noise in the passenger cabin than a second vehicle that is nominally the same due to manufacturing variations found between the exhaust components installed in the two vehicles. The variations can also be caused by other sources of vibration noise including, but not limited to, structure assembly, mounts, bushings, etc.

SUMMARY

In one non-limiting embodiment, an automotive vehicle comprises an internal combustion engine that generates exhaust gas in response to combusting an air/fuel mixture. An exhaust system is configured to expel the exhaust gas from the vehicle via at least one of a first exhaust conduit and a second exhaust conduit. At least one disturbance sensor is installed within a cabin of the vehicle. The at least one disturbance sensor is configured to detect a disturbance within the cabin and to output a disturbance signal indicative of the disturbance. An exhaust valve has plurality of adjustable positions selectable from a fully open position to a fully closed position. Each position of the exhaust valve adjusts an amount of the exhaust gas delivered to the first and second exhaust conduits. An electronic hardware controller is in signal communication with the at least one disturbance sensor and the exhaust valve. The controller is configured to adjust the position of the exhaust valve based on the disturbance signal to reduce the disturbance within the cabin.

In another non-limiting embodiment of a cabin disturbance mitigation system is configured to reduce disturbances within a cabin of an automotive vehicle. The cabin disturbance mitigation system comprises an exhaust system including a first exhaust conduit configured to apply a first attenuation to exhaust gas flowing therethrough, and a second exhaust conduit configured to apply a second attenuation different from the first attenuation to exhaust gas flowing therethrough. The cabin disturbance mitigation system further includes an exhaust valve having a plurality of adjustable positions. Each position of the exhaust valve adjusting an amount of the exhaust gas delivered to the first and second exhaust conduits. At least one disturbance sensor is installed within the cabin. The at least one disturbance sensor is configured to detect a disturbance within the cabin and to output a disturbance signal indicative of the disturbance. An electronic hardware controller is in signal communication with the at least one disturbance sensor and the exhaust valve. The controller is configured to adjust a position of the exhaust valve based on the disturbance signal to reduce the disturbance within the cabin.

In yet another non-limiting embodiment, a method of reducing disturbances and vehicle-to-vehicle variations comprises generating exhaust gas in response to combusting an air/fuel mixture, and delivering the exhaust gas to an exhaust system including a first exhaust conduit and a second exhaust conduit. The method further includes detecting a disturbance within the cabin and outputting a disturbance signal indicative of the disturbance. The method further includes adjusting a position of an exhaust valve to adjust an amount of exhaust gas delivered to the first and second exhaust conduits based on the disturbance signal thereby reducing the disturbance within the cabin, the exhaust valve having a plurality of adjustable positions to vary an amount of the exhaust gas delivered to the first and second exhaust gas conduits.

The above features of the disclosure are readily apparent from the following detailed description of the various non-limiting embodiments when taken in connection with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

Various non-limiting embodiments provide a vehicle including a cabin disturbance mitigation system to mitigate or suppress various types of disturbances existing within the cabin of the vehicle. At least one embodiment includes an electronic hardware controller (controller) configured to adjust a position of an exhaust valve to reduce disturbances within the cabin caused by exhaust gas combusted by the vehicle's engine. In at least one non-limiting embodiment, the vehicle includes a dual-path muffler system which provides first and second exhaust conduits for exhausting the exhaust gas from the vehicle. A first conduit delivers the exhaust gas directly from the vehicle, while the second conduit delivers the exhaust gas within the muffler housing where it realizes noise and pressure attenuation before entering the second exhaust conduit which exhausts the exhaust gas from the vehicle. The position of the exhaust valve (e.g., the opening angle of the valve) controls the amount of exhaust gas delivered to the first and second exhaust conduits.

Pressure pulsations generated by the engine, traveling down the exhaust system, and exiting the exhaust system at the tail pipe are described as exhaust noise. Exhaust noise transfers through the surrounding air and into the cabin of the vehicle. At certain driving conditions, the exhaust noise is more prevalent to the driver and/or passengers in the cabin. The high exhaust pressure pulsations can be reduced by expelling the exhaust gas from within narrow conduits and into a larger area, for example, a muffler. Reducing the exhaust pressure pulsations in this way reduces the amplitude of the pressure pulsations that exit the exhaust system at the tail pipe, which reduces the exhaust noise level. Reducing the exhaust pressure pulsations may also increase the back pressure in the exhaust system which may reduce the engine performance, for example, fuel economy, generated torque, or generated power.

It is necessary to find an optimum design of exhaust pressure pulsation reducing elements that reduce the exhaust noise to an acceptable amplitude, but do not reduce the other engine performance factors (i.e. fuel economy, generated torque, generated power, etc.) in a way that is not acceptable. In at least one non-limiting embodiment, the dual-path muffler system includes a housing that defines an inner spacing having a volume much larger than the volume of the exhaust conduits. The larger internal space of the housing (i.e. larger volume) serves to increase backpressure of the exhaust system and reduce the amplitude of the exhaust pressure pulsations traveling through the exhaust system. Accordingly, exhaust noise caused by pressure pulsations traveling through the exhaust system can be reduced as more exhaust gas is expelled from the exhaust conduit and into the inner spacing of the housing.

The controller can monitor disturbances within the cabin, such as acoustic noise, vibrations, etc., caused by exhaust noise, and adjust the position of the exhaust valve. Accordingly, the flow path of the exhaust gas is adjusted to reduce the exhaust noise, thereby reducing the cabin disturbances realized by the vehicle driver and/or passengers. Operation of the exhaust valve angle based on detected cabin noise to reduce the exhaust noise also results in the mitigation, or even complete elimination, of vehicle-to-vehicle noise variations.

Figure 1:
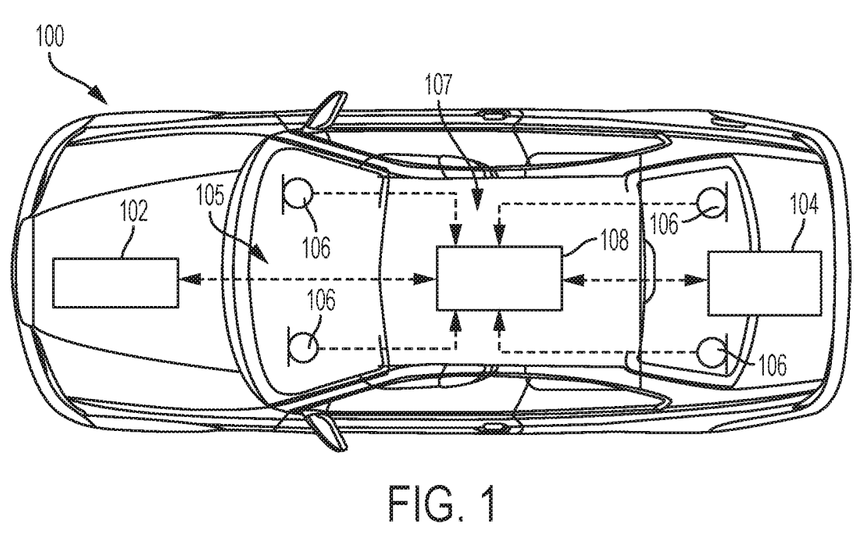
FIG. 1 illustrates a vehicle including a cabin disturbance mitigation system according to a non-limiting embodiment.

Turning now to FIG. 1, a vehicle 100 is illustrated according to a non-limiting embodiment. The vehicle 100 includes an engine 102, an exhaust system 104, and a cabin 105 including one or more disturbance sensors 106 installed therein. The vehicle 100 further includes an electronic hardware controller 108 in signal communication with the engine 102, the exhaust system 104 and the disturbance sensors 106 to define a cabin disturbance mitigation system 107. The cabin disturbance mitigation system 107 is configured to reduce cabin disturbances caused by the exhaust system 104 such as, for example, exhaust boom.

The controller 108 can be employed as an individual controller or can be integrated in another controller such as, for example, an engine controller. Various types of engines 102 can be employed including, but not limited to diesel and gasoline systems. Hybrid engine systems can also be employed, which include an internal combustion engine that works in conjunction with an electric motor.

Figure 2A:
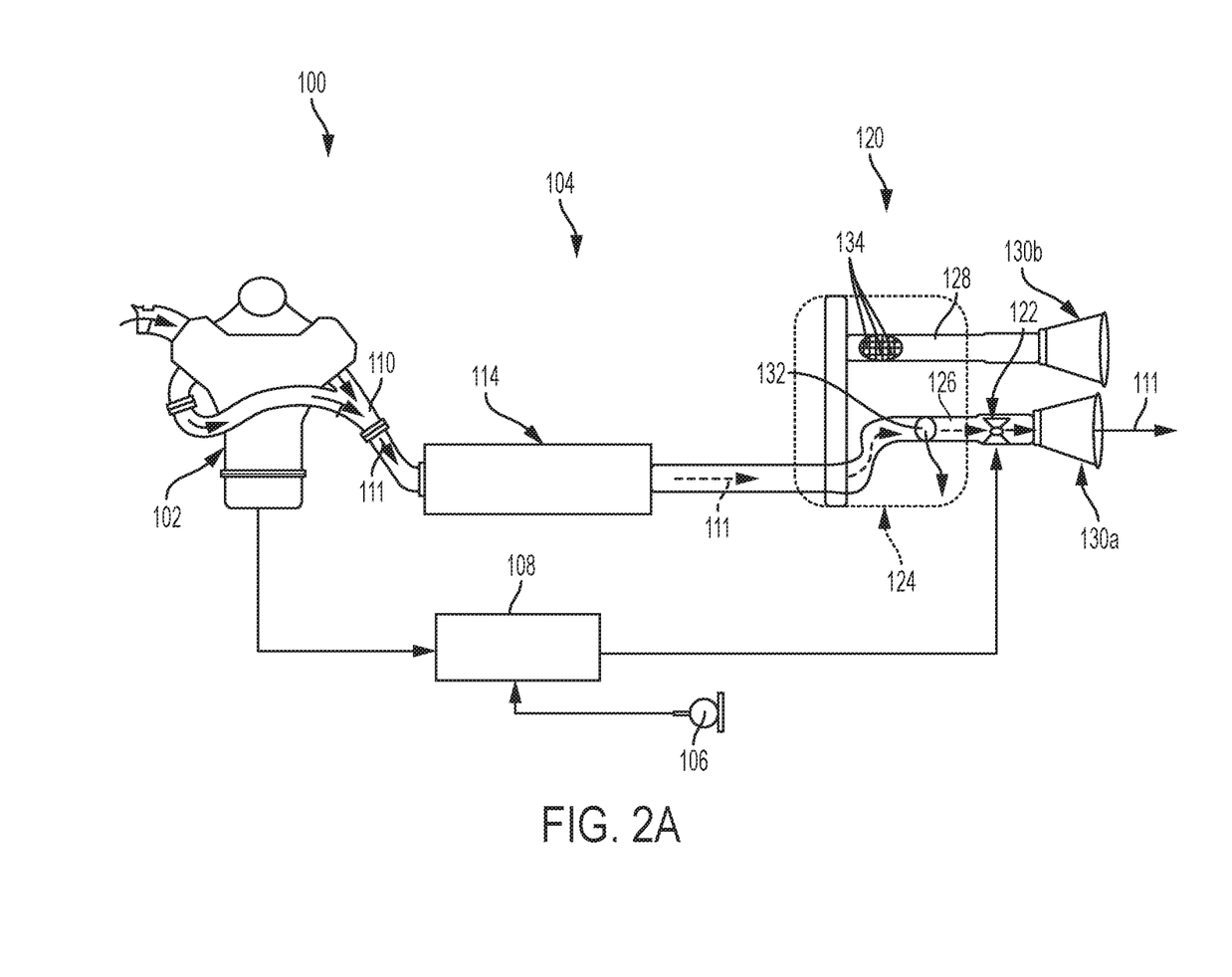
FIGS. 2A and 2B are diagrams illustrating operation of a cabin disturbance mitigation system according to a non-limiting embodiment.
Figure 2B:
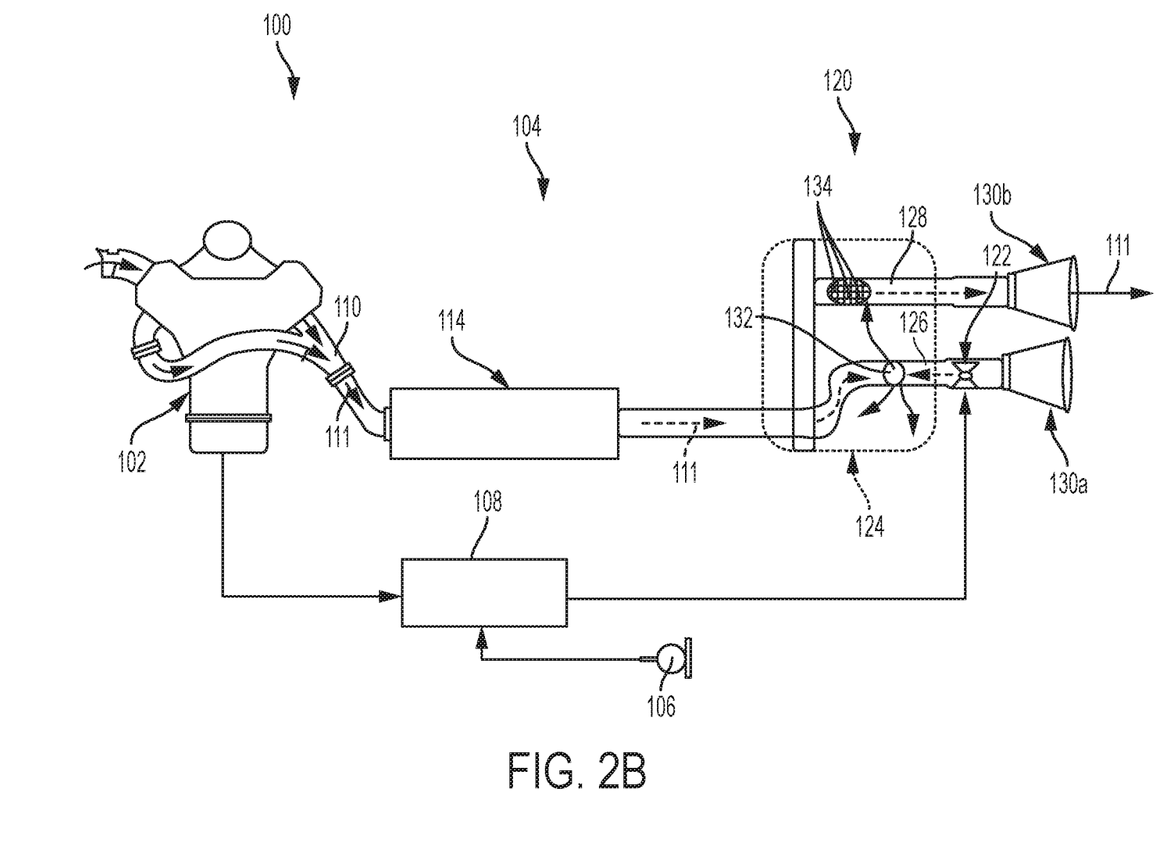

As illustrated in FIGS. 2A-2B, the exhaust system 104 includes one or more exhaust gas conduits 110 that deliver exhaust gas 111 combusted from one or more cylinders of the engine 102 to an exhaust treatment system 114. The exhaust treatment system 114 includes one or more exhaust treatment devices including, but not limited to, an oxidation catalyst device, a selective catalytic reduction device and a particulate filter device. The exhaust treatment system 114 may include various combinations of one or more of the exhaust treatment devices described herein, and/or other exhaust treatment devices (not shown) and is not limited to the present example.

The vehicle 100 further includes one or more disturbance sensors 106, a dual-path muffler system 120, and an exhaust valve 122. The disturbance sensors 106 are installed at various locations within the cabin 105 (see FIG. 1). For instance, one or more front disturbance sensors 106 are located at the front area of the cabin 105 while one or more rear disturbance sensors 106 are located at a rear area of the cabin 105. Various types of disturbance sensors 106 can be employed including, but not limited to, microphones for detecting acoustic sound and accelerometers for detecting vibrations. The microphones can detect a wide variety of acoustic sounds ranging from exhaust boom to passenger voices. In response to detecting a disturbance (e.g., sound, vibration, etc.), the disturbance sensors 106 output an electrical signal to the controller 108 indicative of the disturbances existing within the cabin 105. In this manner, the detected disturbances can be analyzed by the controller 108. For instance, the controller 108 can determine the type of disturbance that exists (e.g., acoustic sounds, vibrations, voices, etc.), the level of the disturbance (e.g., the loudness of the sound or vibration), and the location of the disturbance (e.g., a front passenger compartment, a rear passenger compartment disturbance, etc.).

The dual-path muffler system 120 includes a housing 124 that encases a first exhaust conduit 126 and a second exhaust conduit 128. The first exhaust conduit 126 and the second exhaust conduit 128 deliver the exhaust gas 111 to one or more tailpipes for example, which exhaust the gas 111 from the vehicle 100. In at least one embodiment illustrated in FIG. 2A, the first exhaust conduit 126 directly expels the exhaust gas 111 from the vehicle 100 via a first tailpipe 130a. The second exhaust conduit 128 delivers the exhaust gas 111 to several attenuation components (not shown) that reduce disturbances caused by the exhaust gas 111 before being delivered to a second tailpipe 130b that expels the exhaust gas 111 from the vehicle 100 as shown in FIG. 2B.

The exhaust valve 122 determines (e.g., controls) the quantity of exhaust gas 111 delivered to the first exhaust conduit 126 and/or the second exhaust conduit 128. Although the exhaust valve 122 is illustrated as being disposed within the muffler housing 124, the location of the exhaust valve 122 is not limited thereto. In at least one embodiment, the exhaust valve 122 is an adjustable valve such as a butterfly valve, for example, that can be varied over a plurality of angles to throttle the exhaust gas flowing therethrough. For example, when the exhaust valve 122 is fully closed it completely blocks exhaust gas flow therethrough. The angle of the butterfly valve can be varied so that the valve is transitioned into a fully open state. When fully open, the exhaust valve 122 provides an unrestricted passage, or substantially unrestricted passage, thereby allowing unrestricted exhaust gas flow therethrough. The exhaust valve 122 can also be adjusted to one or more intermediate positions between a fully open position and a fully closed position by incrementally varying the angle of the valve member to throttle the flow of exhaust gas 111.

The controller 108 is in signal communication with the engine 102, the disturbance sensors 106, and the exhaust valve 122. In at least one embodiment, the controller 108 stores in memory a look-up table (LUT) that cross-references disturbance data with respect to the existing driving conditions of the vehicle 100. For example, different acoustic noise levels can be cross-referenced with a given driving condition such as, for example, engine revolutions per minute (RPM), engine torque output, vehicle incline/decline position, etc. In at least one embodiment, test driving trials can be performed to determine the disturbance data produced at a given driving condition. The results obtained from the test driving trials are used to generate the LUT, which is then stored in the controller's 108 memory.

The LUT may also store a plurality of different disturbance thresholds which are cross-referenced with a respective driving condition. The disturbance thresholds may represent a desired maximum level of internal cabin disturbance at a given driving condition. In this manner, the controller 108 can compare characteristics of the disturbances detected by the disturbance sensors 106 to a respective disturbance threshold, and control the exhaust valve 122 to mitigate the disturbances from within the cabin 105 of the vehicle 100.

During operation, the controller 108 continuously monitors the existing operating conditions of the vehicle 100. For example, the controller 108 can continuously monitor the engine 102 to determine engine RPM, current vehicle speed, current engine torque output and disturbance sensors 106, for example, as described herein. The controller 108 can cross-reference the given driving condition with the LUT to determine whether the vehicle 100 is operating at a condition known to introduce undesirable disturbances into the cabin 105. Based on a given driving condition, the controller 108 determines whether the vehicle 100 exists at an operating condition that produces acoustic noise such as exhaust boom, for example, at a level that is undesirable to passengers within the cabin 105. When an operating condition exists which causes undesirable cabin disturbances, the controller 108 adjusts the exhaust valve 122 from its current position.

A first embodiment illustrating operation of the dual-path muffler system 120 according to a non-limiting embodiment is illustrated in FIGS. 2A-2B. As described above, the exhaust valve 122 is an adjustable valve capable of throttling the exhaust gas 111 flowing therethrough. Although the exhaust valve 122 is illustrated as being installed downstream from the housing 124, the location of the exhaust valve 122 is not limited thereto. When the exhaust valve 122 is fully open (see FIG. 2A), the majority of exhaust gas 111 flows through the first exhaust conduit 126, past the exhaust valve 122, and to a first tail pipe 130a where it is expelled from the vehicle 100. Because the exhaust valve 122 is fully open, the majority of the exhaust gas 111 and pressure waves (not shown) are essentially shorted directly to the first tail pipe 130a without being directed into the housing 124 such that a first noise attenuation is applied to the exhaust gas 111.

When, however, the exhaust valve 122 is fully closed (see FIG. 2B), the flow of exhaust gas 111 and resulting pressure waves are blocked from passing through the valve 122. As a result, the exhaust gas 111 backs up into the first exhaust conduit 126, and the exhaust gas 111 along with the pressure waves are directed into the housing 124 via one or more conduit outlets 132. The internal volume of the housing 124 captures the expelled exhaust gas 111 and pressure waves so as to perform a second noise attenuation different and greater than the first noise attenuation. The increased internal volume of the housing 124 also increases backpressure of the exhaust system 104 compared to the less restrictive exhaust path defined by the first exhaust conduit 126. Accordingly, exhaust noise can be reduced as the amount of exhaust gas 111 directed into the housing 124 increases.

The internal volume of the housing 124 serves to further suppress or muffle exhaust noises such as exhaust boom, for example, compared to the attenuation achieved when the exhaust gas 111 is expelled directly from the vehicle 100 via the first exhaust conduit 126 and tailpipe 130a. The second exhaust conduit 128 includes one or more inlet openings 134. The exhaust gas 111 and reduced pressure waves within the housing 124 are conveyed into the second exhaust conduit 128 via the inlet openings 134, and are expelled from the vehicle by a second tailpipe 130b. Accordingly, the quantity of exhaust gas 111 delivered to the first exhaust conduit 126 and the second exhaust conduit 128 can be adjusted or throttled by variably adjusting the position of the exhaust valve 122 from an open position to a closed position (including the intermediate positions therebetween).

Figure 3A:
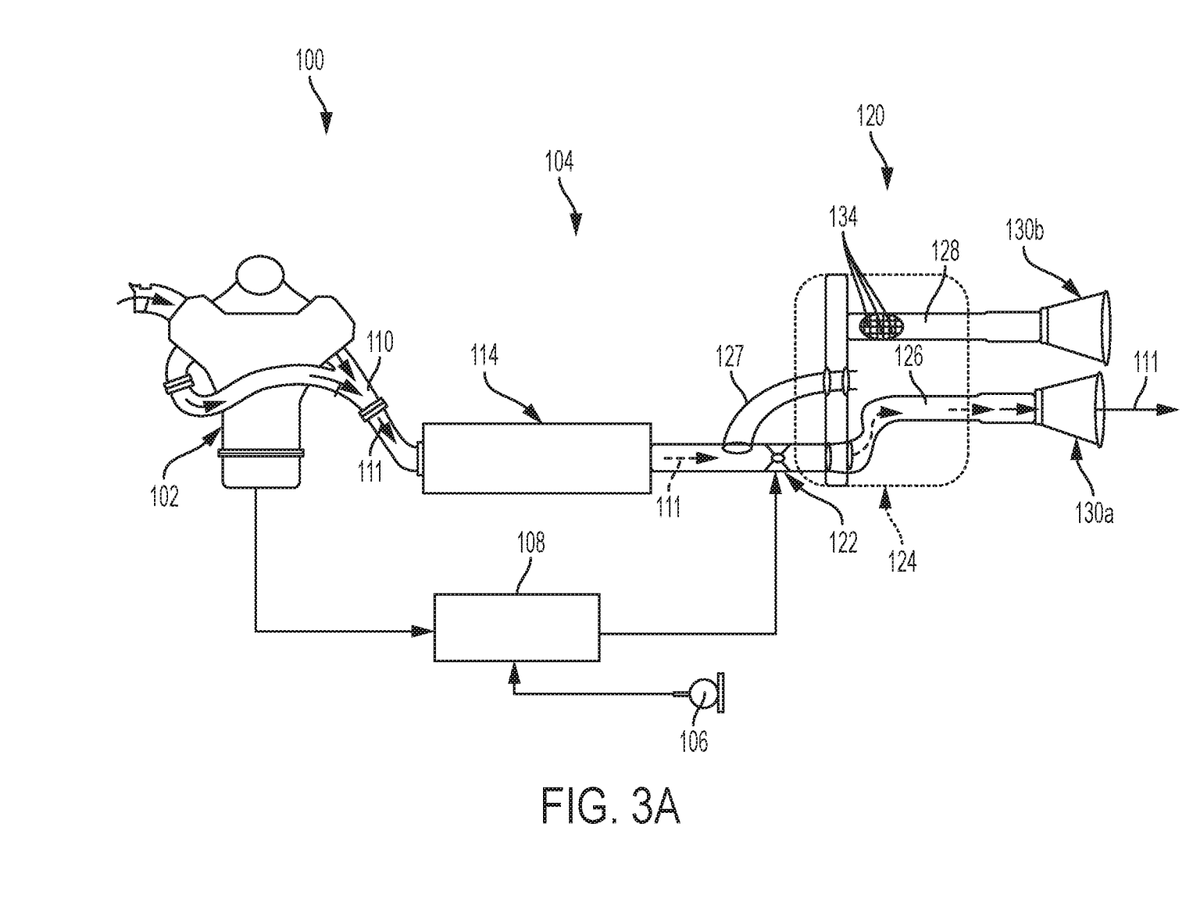
FIGS. 3A and 3B are diagrams illustrating operation of a cabin disturbance mitigation system according to another non-limiting embodiment.
Figure 3B:
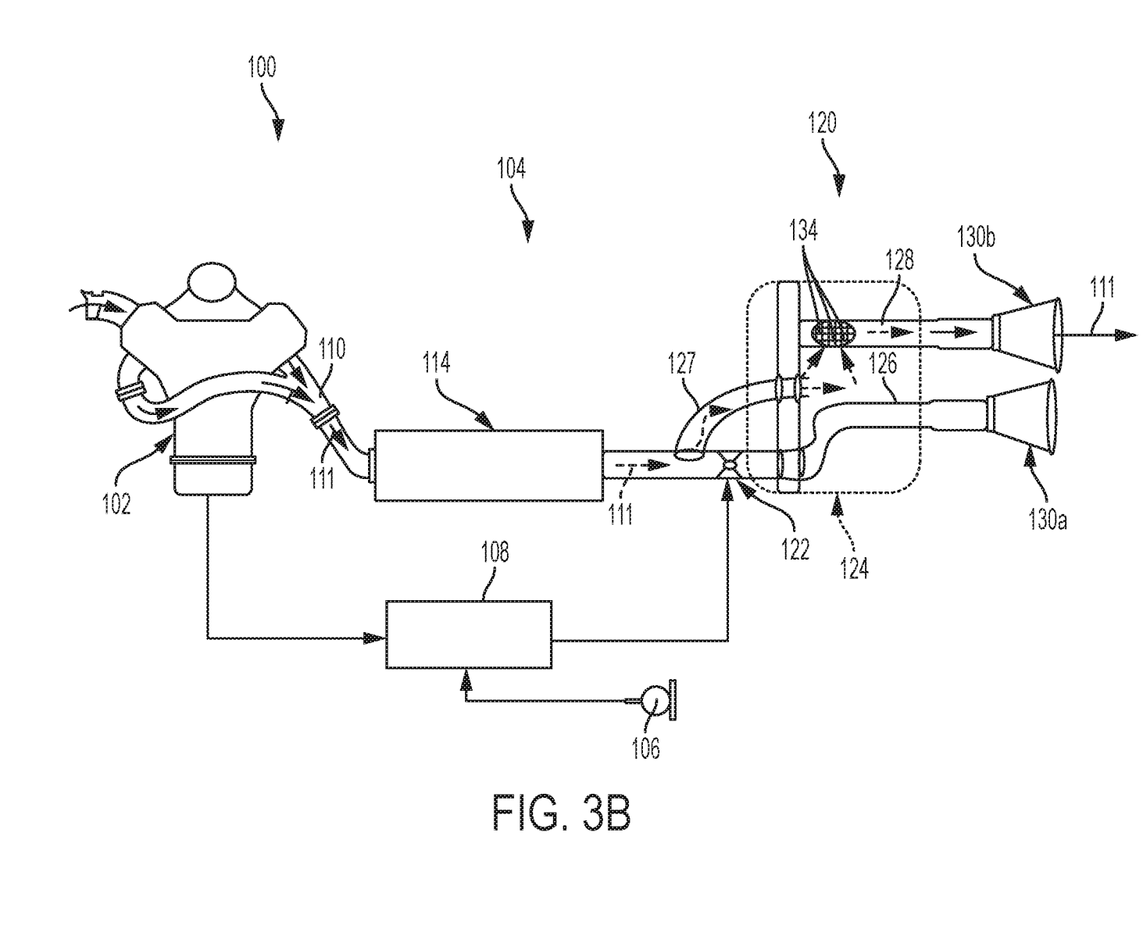

Another non-limiting embodiment of the dual-path muffler system 120 is illustrated in FIGS. 3A and 3B. The exhaust valve 122 can be adjusted between a fully open position and a fully closed position (and a plurality of intermediate positions therebetween) as described herein. In this embodiment, the exhaust valve 122 is located upstream of the housing 124 compared to the location of the exhaust valve 122 included in the dual-path muffler system 120 illustrated in FIGS. 2A-2B. The embodiment illustrated in FIGS. 3A-3B also includes a bypass conduit 127 having an inlet in fluid communication with a first exhaust conduit 126 and an outlet in fluid communication with internal volume of the housing 124. Similar to the operation of the dual-path muffler system 120 described above, the position of the exhaust valve 122 can be varied to adjust or throttle the quantity of exhaust gas 111 delivered to the first exhaust conduit 126 and the bypass conduit 127. Accordingly, the quantity of exhaust gas 111 delivered to the internal volume of the housing 124 can also be varied.

For instance, when the exhaust valve 122 is fully open (see FIG. 3A), the majority of exhaust gas 111 flows through the first exhaust conduit 126 and to a first tail pipe 130a where it is expelled from the vehicle 100. Because the exhaust valve 122 is fully open, the majority of the exhaust gas 111 and associated pressure waves are essentially shorted directly to the first tail pipe 130a such that little of the exhaust gas 111 is directed to the interior volume of the housing 124. Accordingly, a first noise attenuation is applied to the exhaust gas 111.

When, however, the exhaust valve 122 is fully closed (see FIG. 3B), the flow of exhaust gas 111 and associated pressure waves are directed through the bypass conduit 127, and into the housing 124. The internal volume of the housing 124 performs a second attenuation different and greater than the first attenuation as described herein.

A second exhaust conduit 128 is provided which includes one or more inlet openings 134. The exhaust gas 111 and associated pressure waves contained within the housing 124 are conveyed into the second exhaust conduit 128 via the inlet openings 134, and are expelled from the vehicle 100 by a second tailpipe 130b. Accordingly, the quantity of exhaust gas 111 delivered to the first exhaust conduit 126 and the bypass conduit 127 (thus the internal volume of the housing 124) can be adjusted or throttled by varying the position of the exhaust valve 122 from the open position to the closed position (including the intermediate positions therebetween).

Figure 4A:
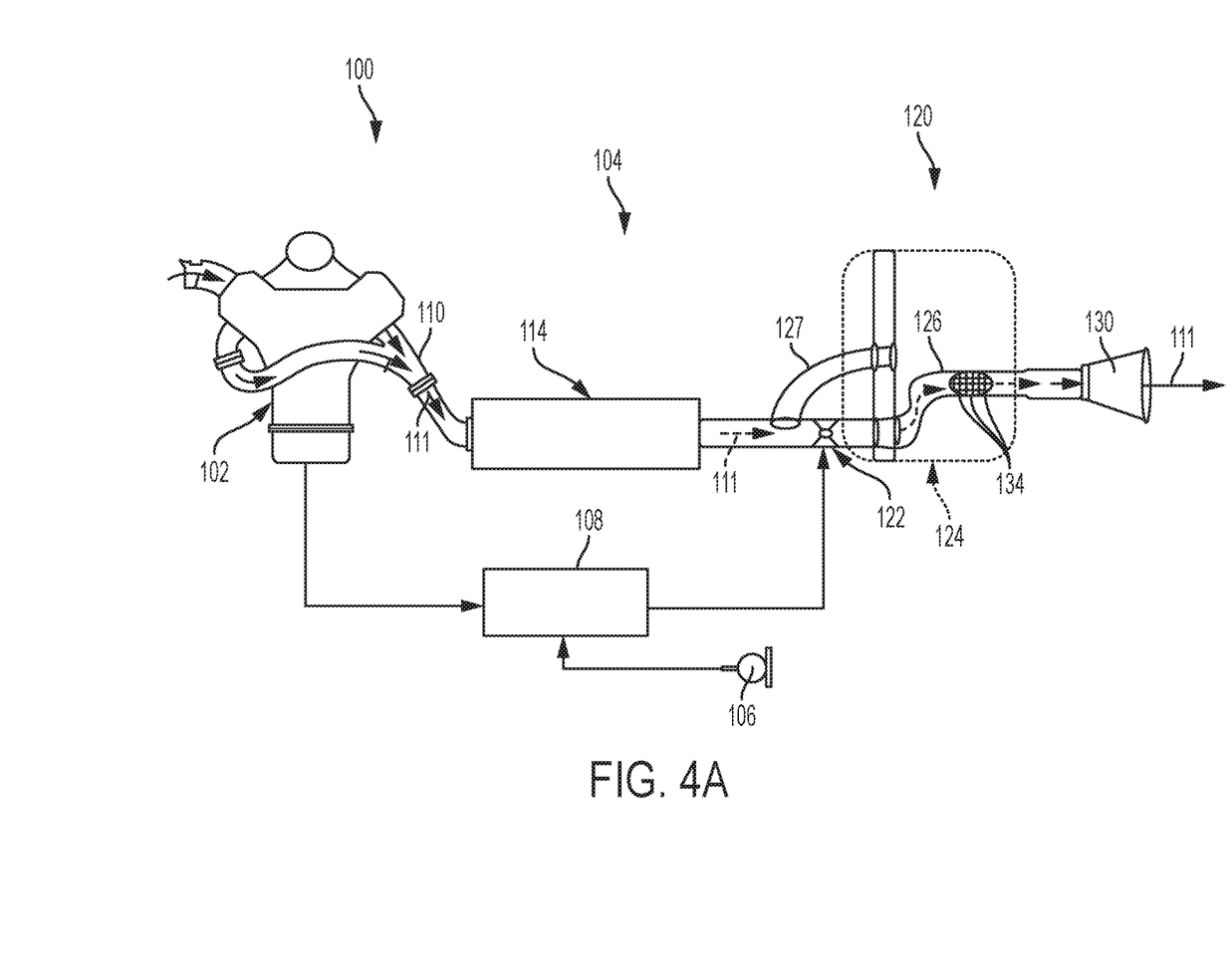
FIGS. 4A and 4B are diagrams illustrating operation of a cabin disturbance mitigation system according to yet another non-limiting embodiment.
Figure 4B:
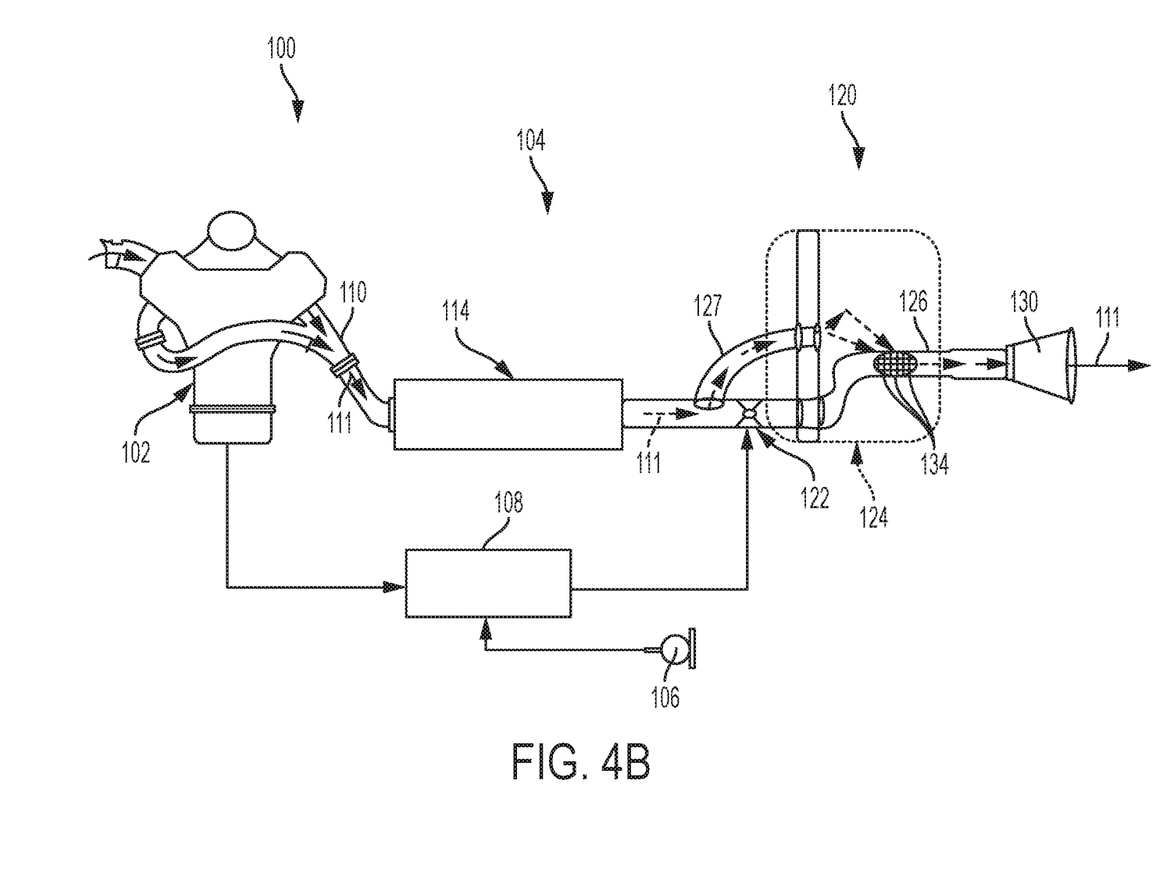

Yet another non-limiting embodiment of the dual-path muffler system 120 is illustrated in FIGS. 4A and 4B. The exhaust valve 122 can be adjusted between a fully open position and a fully closed position (and a plurality of intermediate positions therebetween) as described herein. Similar to the embodiment illustrated in FIGS. 3A-3B, the exhaust valve 122 is located upstream from the housing 124, and a bypass conduit 127 is provided that bypasses the exhaust valve 122 to direct exhaust gas 111 into the interior volume of the housing 124 based on the position of the exhaust valve 122. The first exhaust conduit 126 serves as a first exhaust path while the bypass conduit 127 serves as a second exhaust path. Unlike the previous embodiments, however, the muffler system 120 illustrated in FIGS. 4A-4B employs a single tailpipe 130 instead of two independent tailpipes 130a-130b.

When the exhaust valve 122 is fully open (see FIG. 4A), the majority of exhaust gas 111 flows through a first exhaust conduit 126 and to the tail pipe 130 where it is expelled from the vehicle 100. Because the exhaust valve 122 is fully open, the majority of the exhaust gas 111 and associated pressure waves are essentially routed directly to the tail pipe 130. Accordingly, a first noise attenuation is applied to the exhaust gas 111.

When, however, the exhaust valve 122 is fully closed (see FIG. 4B), the flow of exhaust gas 111 and associated pressure waves are blocked from passing therethrough. As a result, the exhaust gas 111 and associated pressure waves are directed into the bypass conduit 127 for delivery to the housing 124. The internal volume of the housing 124 performs a second attenuation different and greater than the first attenuation, as described herein.

In an embodiment, a portion of the exhaust conduit 126 located within the housing 124 is provided with one or more inlet openings 134. The exhaust gas 111 transiting the housing 124 is returned to the exhaust conduit 126 via the inlet openings 134, and is expelled from the vehicle 100 by the tailpipe 130. Accordingly, the amount of exhaust gas 111 passed directly through the exhaust conduit 126 and/or the bypass conduit 127 and through the housing volume can be adjusted or throttled by varying the position of the exhaust valve 122 from the open position to the closed position (including the intermediate positions therebetween).

In any of the embodiments described herein, the controller 108 is configured to adjust the position of the exhaust valve 122 based on the disturbance signal output from disturbance sensors 106 (e.g., microphone, accelerometer, etc.) to reduce disturbances within the cabin 105. The disturbances include, for example, acoustic noise and/or vibrations caused by exhaust noises such as exhaust boom, for example. The controller 108 can adjust the exhaust valve 122 based on a disturbance characteristic of the detected disturbance. For example, the controller 108 can compare a noise level of exhaust noise (e.g., exhaust boom) detected by the disturbance sensor 106 (e.g., microphone) to a maximum allowed noise level threshold. In response to the detected noise level exceeding the noise level threshold, the controller 108 adjusts the position of the exhaust valve 122, thereby adjusting the flow of exhaust gas 111 through the dual-path muffler system 120 to reduce and mitigate the exhaust noise from within cabin 105.

As described herein, the controller 108 is also in signal communication with the engine 102 to determine an existing operating condition of the vehicle 100. The existing operating condition can be compared to a disturbance threshold included among several different disturbance thresholds listed in a LUT stored in memory of the controller 108. For instance, different disturbance thresholds listed in the LUT are cross-referenced with a corresponding operating condition. Based on the existing operating condition, the controller 108 compares the disturbance characteristic (e.g., noise level) existing in the cabin 105 to the corresponding disturbance threshold (e.g., a maximum noise level) indicated by the LUT, and adjusts the exhaust valve 122 so as to reduce the disturbance characteristic below the disturbance threshold.

In at least one embodiment, the controller 108 stores one or more required vehicle operating conditions including, but not limited to, fuel economy requirements, emissions output requirements, back pressure, flow noise, and/or driving performance requirements. In this manner, the controller 108 is capable of constraining the adjustment of the exhaust valve 122 to a position that does not violate the required vehicle operation conditions to minimize the negative collateral effect resulting from adjusting the valve angle. For example, the controller 108 can adjust the position of the exhaust valve 122 in response to satisfying the least one required operating condition, and returns the exhaust valve 122 to a previous position in response to violating the at least one required operating condition.

In at least one embodiment, the controller 108 also can determine a position of at least one passenger (not shown) located in the cabin 105 based on the disturbance signal output by one or more disturbance sensors 106. For instance, passengers located in the front area of the cabin 105 can be identified by the controller 108 via disturbance signals (e.g., detected passenger noise) output from front disturbance sensors 106 (e.g., front microphones 106), while passengers located in the rear area of the cabin 105 can be identified by the controller 108 via disturbance signals output from rear disturbance sensors 106 (e.g., rear microphones 106). When the controller 108 determines that passengers are located in the rear area of the cabin 105 (i.e., closer to the dual-path muffler system 120), the controller 108 can further adjust the exhaust valve 120 to further reduce the exhaust noise (e.g., exhaust boom) realized by the rear passengers.

Figure 5:
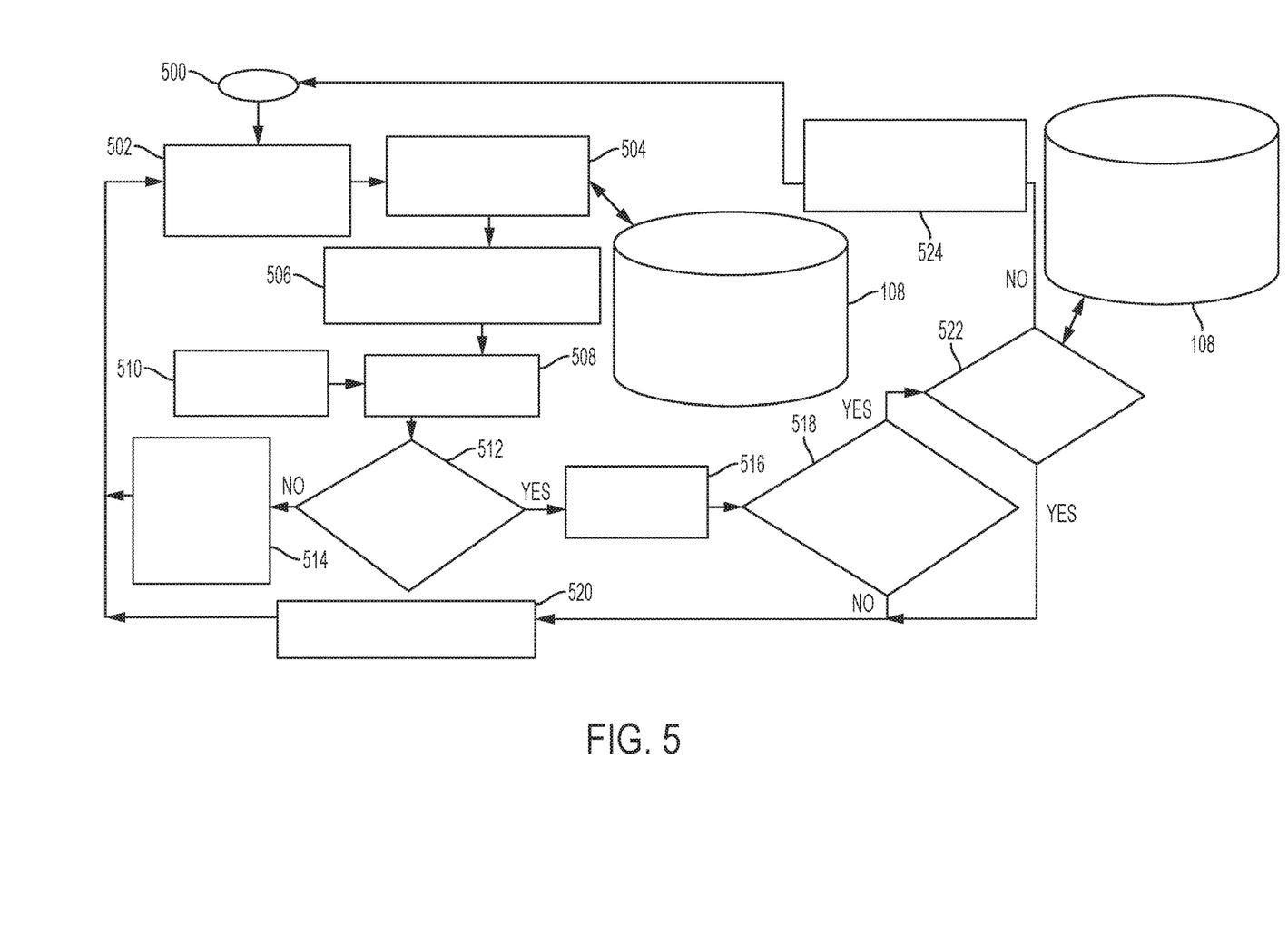
FIG. 5 is a flow diagram illustrating a method of reducing disturbances from within a vehicle cabin according to a non-limiting embodiment.

With reference now to FIG. 5, a method of mitigating vehicle cabin disturbances is illustrated according to a non-limiting embodiment. The method begins at operation 500, and at operation 502 the existing driving conditions of the vehicle 100 are determined. The existing driving conditions include, but are not limited to, current engine RPM, current vehicle speed, current engine torque output, and other vehicle data delivered to vehicle data network, e.g., controller area network (CAN). At operation 504, a disturbance threshold corresponding to the existing driving conditions is determined. The disturbance threshold includes, for example, a desired maximum level of internal cabin noise (e.g., exhaust boom within the cabin 105) at the existing driving condition. In at least one embodiment, various disturbance thresholds corresponding to a given vehicle condition are cross-referenced in a LUT, which is stored in a database or memory of the controller 108. At operation 506, the cabin 105 is monitored via one or more disturbance sensors 106. For example, front microphones and/or rear microphones detect acoustic sounds within the cabin 105 and accelerometers detect vibrations within the cabin 105 contributing to additional cabin noise. At operation 508, an engine order calculation is performed based on a RPM signal generated at operation 510. The engine order calculation allows the exhaust noise that is perceived inside the passenger cabin, which is directly related to the engine speed, to be identified in contrast to other non-engine speed related noise disturbances such as, for example, passenger voices.

Turning to operation 512, characteristics of the detected disturbances, for example engine firing order, are compared to a disturbance threshold. For example, a sound level of the acoustic noise detected by the microphones is compared to a maximum allowed noise level threshold. When the disturbance characteristics (e.g., noise level of the engine firing order) is at or below the disturbance threshold, a position of the exhaust valve 122 is maintained at operation 514, and the method returns to operation 502 to continue determining the current driving conditions of the vehicle 100.

When, however, the disturbance characteristics exceed the disturbance threshold, the exhaust valve 122 is adjusted at operation 516. At operation 518, disturbance characteristics of the disturbances detected by the disturbance sensors 106 are again compared to the disturbance threshold following adjustment of the exhaust valve to determine if adjusting the exhaust valve 122 modified the detected cabin disturbances. In at least one embodiment, the valve motion is iterated at decreasing valve angles to determine the movement necessary to improve the noise disturbance. The valve movement iteration will stop if it violates one of the other operating conditions or a maximum allowable movement. In at least one embodiment, when the disturbance characteristics have not changed (e.g., the noise level of the engine firing order remains same) after adjusting an opening/closing angle of the exhaust valve 122, the exhaust valve 122 is returned to its previous position at operation 520, and the method returns to operation 502 to continue determining the current driving conditions of the vehicle 100.

When, however, the disturbance characteristics change (e.g., the noise level of the engine firing order is reduced) after adjusting an opening/closing angle of the exhaust valve 122, an analysis is performed at operation 522 to determine whether the adjusted exhaust valve position violates one or more required operating conditions such as, for example, fuel economy requirements, emissions output requirements, back pressure, flow noise, and/or driving performance requirements. In at least one embodiment, various operating condition requirements are stored in a database or memory of the controller 108. When the adjusted exhaust valve position violates one or more required operating conditions, the exhaust valve 122 is returned to its previous position at operation 520, and the method returns to operation 502 to continue determining the current driving conditions of the vehicle 100.

When, no required operating conditions are violated at operation 522, the method proceeds to operation 524 where adjustment of the exhaust valve 122 stops, or the exhaust valve is returned to its previous position so as to reduce the disturbance within the cabin 105 of the vehicle 102. The method can then return to operation 500 to repeat the process and continue adjusting the position of the exhaust valve 122 to reduce cabin disturbances as the vehicle conditions determined at operation 502 continue to change.

Figure 6:
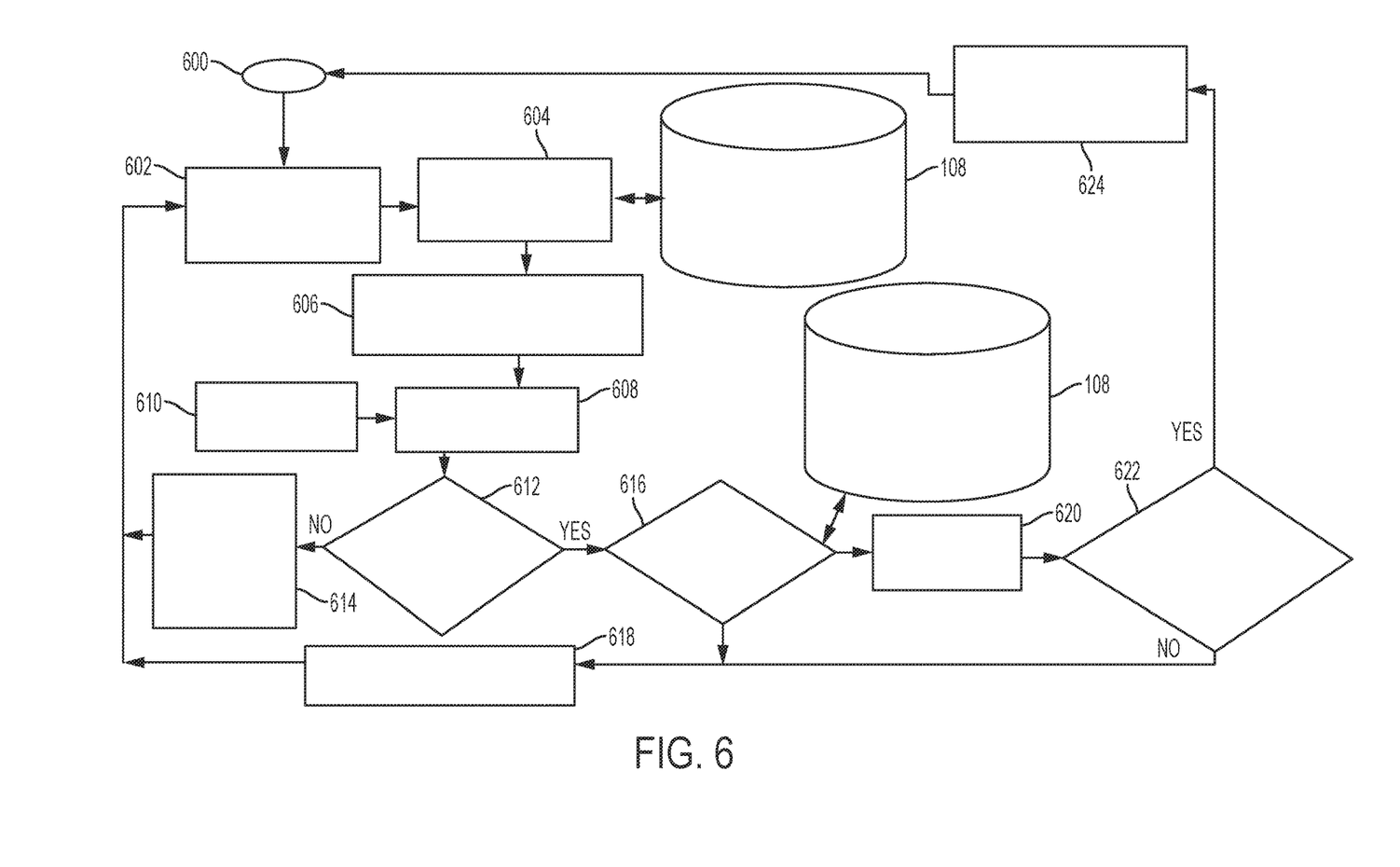
FIG. 6 is a flow diagram illustrating a method of reducing disturbances from within a vehicle cabin according to another non-limiting embodiment.

With reference now to FIG. 6, a method of mitigating vehicle cabin disturbances is illustrated according to another non-limiting embodiment. The method begins at operation 600, and at operation 602 the existing driving conditions of the vehicle 100 are determined. The existing driving conditions include, but are not limited to, current engine RPM, current vehicle speed, current engine torque output, and other vehicle data delivered to vehicle data network, e.g., controller area network (CAN). At operation 604, a disturbance threshold corresponding to the existing driving conditions is determined. The disturbance threshold includes, for example, a desired maximum level of internal cabin noise (e.g., exhaust boom within the cabin 105) at the existing driving condition. In at least one embodiment, various disturbance thresholds corresponding to a given vehicle condition are cross-referenced in a LUT, which is stored in a database or memory of the controller 108. At operation 606, the cabin 105 is monitored via one or more disturbance sensors 106. For example, front microphones and/or rear microphones detect acoustic sounds within the cabin 105 and accelerometers detect vibrations within the cabin 105 contributing to additional cabin noise. At operation 608, an engine order calculation is performed based on a RPM signal generated at operation 610. The engine order calculation allows the exhaust noise that is perceived inside the passenger cabin, which is directly related to the engine speed, to be identified in contrast to other non-engine speed related noise disturbances such as, for example, passenger voices.

Turning to operation 612, characteristics of the detected disturbances, for example engine firing order, are compared to a disturbance threshold. For example, a sound level of the acoustic noise detected by the microphones is compared to a maximum allowed noise level threshold. When the disturbance characteristics (e.g., noise level of the engine firing order) is at or below the disturbance threshold, a position of the exhaust valve 122 is maintained at operation 614, and the method returns to operation 602 to continue determining the current driving conditions of the vehicle 100.

When, however, the disturbance characteristics exceed the disturbance threshold, an analysis is performed at operation 616 to determine whether the adjusted exhaust valve position violates one or more required operating conditions such as, for example, fuel economy requirements, emissions output requirements, back pressure, flow noise, and/or driving performance requirements. In at least one embodiment, various operating condition requirements are stored in a database or memory of the controller 108. When the adjusted exhaust valve position violates one or more required operating conditions, the current exhaust valve 122 angle position is maintained at operation 618, and the method returns to operation 602 to continue determining the current driving conditions of the vehicle 100.

When, however, no required operating conditions are violated at operation 616, the method proceeds to operation 620 and the exhaust valve 122 is adjusted. At operation 622, disturbance characteristics of the disturbances detected by the disturbance sensors 106 are again compared to the disturbance threshold following adjustment of the exhaust valve. In at least one embodiment, the valve motion is iterated at decreasing valve angles to determine the movement necessary to improve the noise disturbance. The valve movement iteration will stop at operation 618 if it violates one of the other operating conditions or a maximum allowable movement. In at least one embodiment, when the disturbance characteristics have not changed (e.g., the noise level of the engine firing order remains same) after adjusting an opening/closing angle of the exhaust valve 122, the exhaust valve 122 is returned to its previous position at operation 618, and the method returns to operation 602 to continue determining the current driving conditions of the vehicle 100.

When, however, the disturbance characteristics change (e.g., the noise level of the engine firing order is reduced) after adjusting an opening/closing angle of the exhaust valve 122, the adjusted position of the exhaust valve 122 is maintained at operation 624 so as to reduce the disturbance within the cabin 105 of the vehicle 102. The method can then return to operation 600 to repeat the process and continue adjusting the position of the exhaust valve 122 to reduce cabin disturbances as the vehicle conditions determined at operation 602 continue to change.

As described above, various non-limiting embodiments provide a vehicle including a cabin disturbance mitigation system configured to reduce disturbances such as undesired acoustic noise (e.g., exhaust boom) from within the cabin of the vehicle. The acoustic noise includes, for example, exhaust boom occurring at a given operating condition of the vehicle. The cabin disturbance mitigation system includes a dual-path muffler system and an exhaust valve that can be adjusted to control or throttle the quantity of exhaust gas flowing through the dual-path muffler system. Based on the disturbances detected within the cabin of the vehicle, the position of the exhaust valve is adjusted thereby reducing or mitigating cabin disturbances such as exhaust boom, for example. Not only is cabin noise reduced, vehicle-to-vehicle noise variation caused by fabrication variations of exhaust components is mitigated, or even eliminated completely.

As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a hardware microcontroller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While various non-limited embodiments have been described herein, it will be understood by those skilled in the art that various changes may be made and equivalents may be substituted for elements thereof without departing from the scope of the inventive teachings. In addition, many modifications may be made to adapt a particular situation or material to the teachings without departing from the essential scope thereof. Therefore, it is intended that the inventive teachings recited herein not be limited to the particular embodiments disclosed, but will include all the non-limiting embodiments falling within the scope of the application.

What is claimed is:

1. An automotive vehicle, comprising:
    an internal combustion engine that generates exhaust gas in response to combusting an air/fuel mixture;
    an exhaust system comprising a first exhaust conduit and a second exhaust conduit, the exhaust system configured to expel the exhaust gas from the vehicle via at least one of the first exhaust conduit and the second exhaust conduit, the first exhaust conduit configured to apply a first attenuation to the exhaust gas and the second exhaust conduit configured to apply a second attenuation to the exhaust gas different from the first attenuation;
    at least one disturbance sensor installed within a cabin of the vehicle, the at least one disturbance sensor configured to detect a disturbance within the cabin and to output a disturbance signal indicative of the disturbance;
    an exhaust valve having a plurality of positions, each position of the exhaust valve determining an amount of the exhaust gas delivered to the first and second exhaust conduits; and
    an electronic hardware controller in signal communication with the at least one disturbance sensor and the exhaust valve, the controller configured to adjust the position of the exhaust valve based on the disturbance signal to reduce the disturbance within the cabin,
    wherein the controller determines a position of at least one passenger located in the cabin, and adjusts the exhaust valve based on the position of the passenger.

2. The vehicle of claim 1, wherein the controller determines a disturbance characteristic of the detected disturbance and adjusts the position of the exhaust valve in response to the characteristic exceeding a disturbance threshold so as to adjust the flow of exhaust gas and reduce the disturbance within the cabin.

3. The vehicle of claim 2, wherein the disturbance characteristic is a noise level and the disturbance characteristic threshold is maximum noise level.

4. The vehicle of claim 3, wherein the controller is in signal communication with the internal combustion engine to determine an existing operating condition of the vehicle, and determines the disturbance threshold among a plurality of different disturbance thresholds according to the existing operating condition.

5. The vehicle of claim 4, wherein the controller determines at least one required operating condition of the vehicle, adjusts the position of the exhaust valve in response to satisfying the least one required operating condition, and returns the exhaust valve to a previous position in response to violating the at least one required operating condition.

6. A cabin disturbance mitigation system configured to reduce disturbances within a cabin of an automotive vehicle, the cabin disturbance mitigation system comprising:
    an exhaust system comprising:
        a first exhaust conduit configured to apply a first attenuation to exhaust gas flowing therethrough;
        a second exhaust conduit configured to apply a second attenuation different from the first attenuation, to exhaust gas flowing therethrough;
        an exhaust valve having a plurality of adjustable positions, each position of the exhaust valve adjusting an amount of the exhaust gas delivered to the first and second exhaust conduits;
    at least one disturbance sensor installed within the cabin, the at least one disturbance sensor configured to detect a disturbance within the cabin and to output a disturbance signal indicative of the disturbance; and
    an electronic hardware controller in signal communication with the at least one disturbance sensor and the exhaust valve, the controller configured to adjust a position of the exhaust valve based on the disturbance signal to reduce the disturbance within the cabin
    wherein the controller determines a position of at least one passenger located in the cabin, and adjusts the exhaust valve based on the position of the passenger.

7. The cabin disturbance mitigation system of claim 6, wherein the controller determines a disturbance characteristic of the detected disturbance, and adjusts the position of the exhaust valve in response to the characteristic exceeding a disturbance threshold so as to adjust the quantity of exhaust gas delivered to the first and second exhaust conduits.

8. The cabin disturbance mitigation system of claim 7, wherein the disturbance characteristic is a noise level and the disturbance characteristic threshold is maximum noise level allowed to exist in the cabin.

9. The cabin disturbance mitigation system of claim 7, wherein the controller determines an existing operating condition of the vehicle, and selects the disturbance threshold among a plurality of different disturbance thresholds based on the existing operating condition.

10. The cabin disturbance mitigation system of claim 9, wherein the controller determines at least one required operating condition of the vehicle, adjusts the position of the exhaust valve in response to satisfying the least one required operating condition, and returns the exhaust valve to a previous position in response to violating the at least one required operating condition.

11. A method of reducing disturbances from a vehicle cabin, the method comprising:
generating exhaust gas in response to combusting an air/fuel mixture;
delivering the exhaust gas to an exhaust system including a first exhaust conduit and a second exhaust conduit;
detecting a disturbance within the cabin and outputting a disturbance signal indicative of the disturbance;
adjusting a position of an exhaust valve to adjust a quantity of exhaust gas delivered to the first and second exhaust conduits based on the disturbance signal;
applying a first attenuation to the quantity of the exhaust gas delivered to the first exhaust conduit and applying a second attenuation to the quantity of the exhaust gas delivered to the second exhaust conduit different from the first attenuation thereby reducing the disturbance within the cabin, the exhaust valve having a plurality of positions to vary an amount of the exhaust gas delivered to the first and second exhaust gas conduits; and
determining a position of at least one passenger located in the cabin, and adjusting the exhaust valve based on the position of the passenger.

12. The method of claim 11, further comprising determining a disturbance characteristic of the detected disturbance, and adjusting the position of the exhaust valve in response to the characteristic exceeding a disturbance threshold so as to adjust the flow of exhaust gas and reduce the disturbance within the cabin.

13. The method of claim 12, wherein the disturbance characteristic is a noise level and the disturbance characteristic threshold is maximum noise level.

14. The method of claim 12, further comprising determining an existing operating condition of the vehicle, and determining the disturbance threshold among a plurality of different disturbance thresholds according to the existing operating condition.

15. The method of claim 14 further comprising determining at least one required operating condition of the vehicle, adjusting the position of the exhaust valve in response to satisfying the least one required operating condition, and returning the exhaust valve to a previous position in response to violating the at least one required operating condition.

* * * * *